Sept. 20, 1932. J. R. BARKER 1,878,805
TRACTOR DISK HARROW
Filed Feb. 8, 1928   2 Sheets-Sheet 1
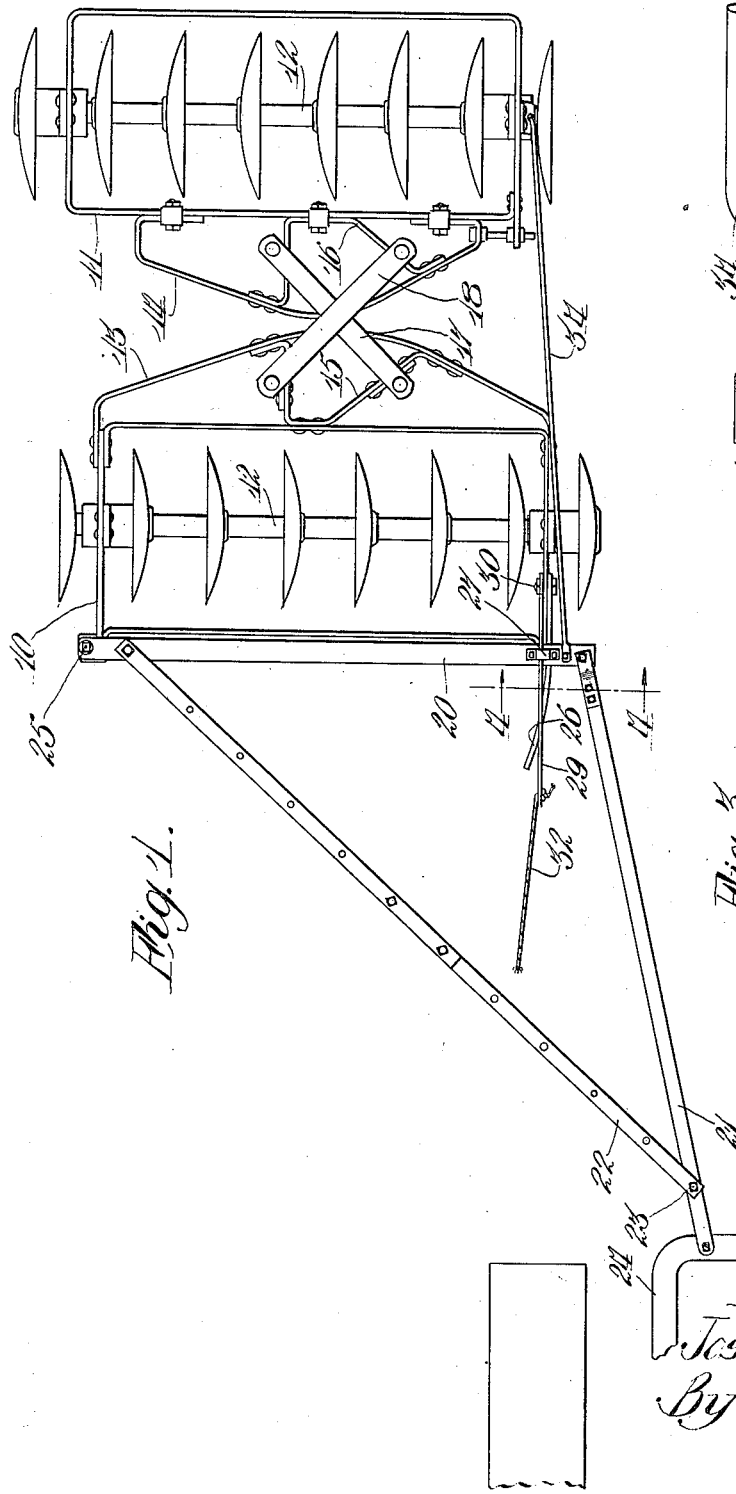
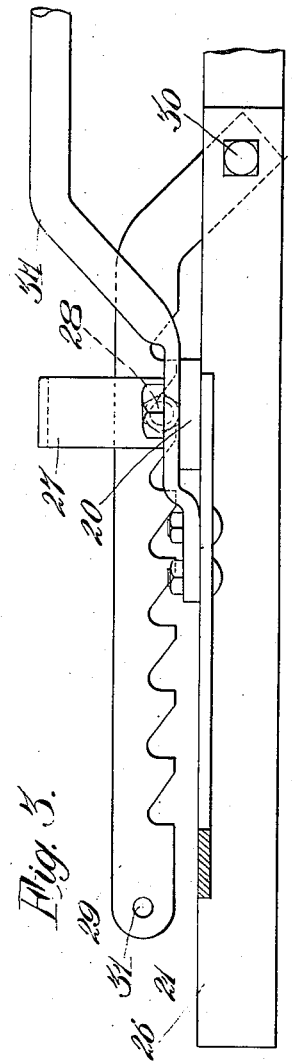

Sept. 20, 1932.  J. R. BARKER  1,878,805
TRACTOR DISK HARROW
Filed Feb. 8, 1928  2 Sheets-Sheet 2
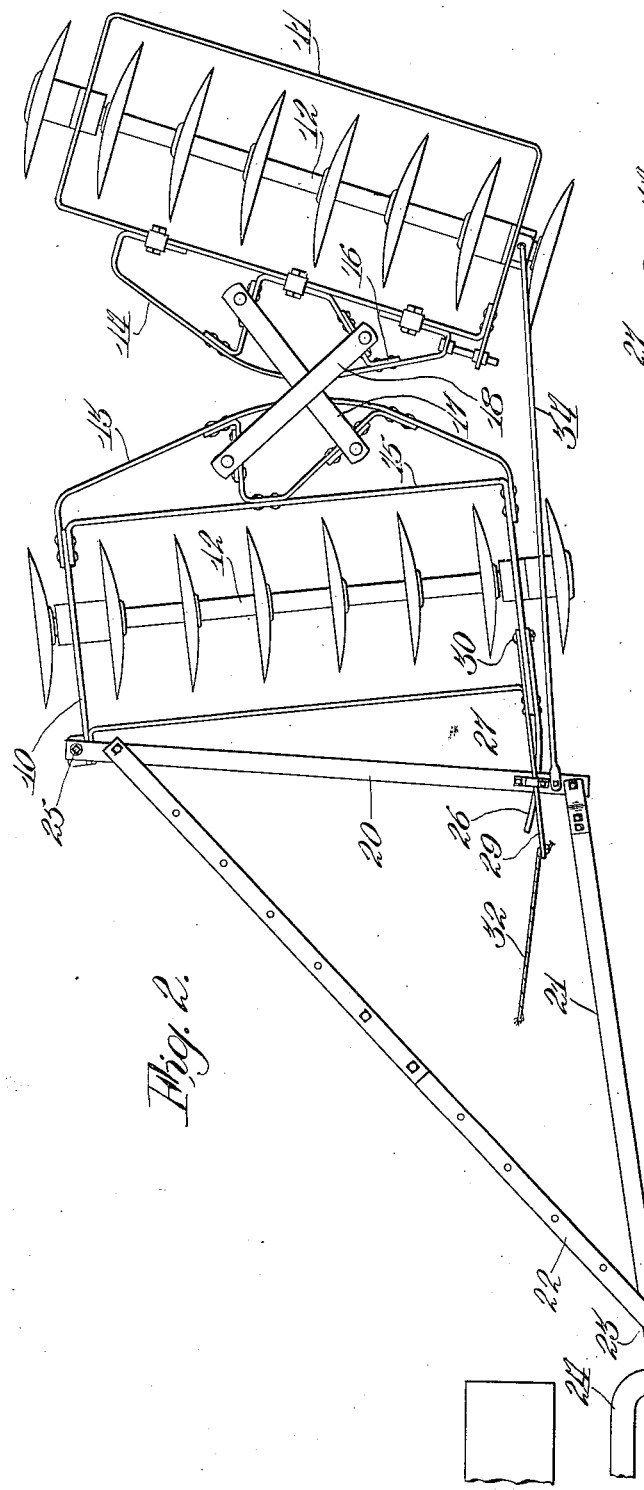
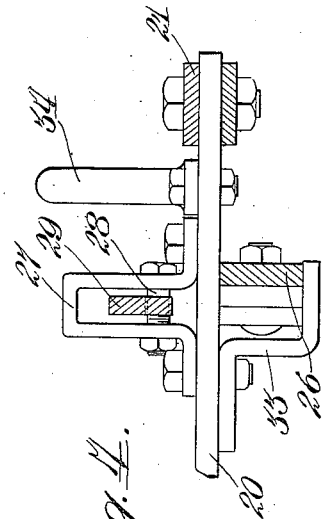
Inventor
Joseph R. Barker Patented Sept. 20, 1932

1,878,805

UNITED STATES PATENT OFFICE

JOSEPH R. BARKER, OF FALL BROOK, CALIFORNIA, ASSIGNOR TO INTERNATIONAL HARVESTER COMPANY, A CORPORATION OF NEW JERSEY

TRACTOR DISK HARROW

Application filed February 8, 1928. Serial No. 252,751.

This invention relates to tractor disk harrows of the two gang, offset, orchard type, and is more particularly directed to improvements in the draft mechanism used therewith.

The main object of the invention is to provide a simple and efficient form of draft controlled mechanism for effecting adjustment of the disk gangs of the harrow from transport to working position, and vice versa.

A further object is to provide mechanism of this type which will be operable through forward and backward movement of the tractor to which the harrow is connected, and which will positively transmit the draft forces to each of the two frames or gangs of the harrow in a manner to cause angular movement thereof in opposite directions about a vertical pivotal connection.

The above and other minor objects and advantages are attained by the structure which will be hereinafter more particularly described and which is illustrated in the accompanying drawings, wherein:

Figure 1 is a plan view of a harrow embodying the mechanism constituting the invention;

Figure 2 is a similar view with the parts in different positions;

Figure 3 is an enlarged detail of the latching means carried by the front harrow frame, as seen in side elevation; and Figure 4 is a second detail view of the latch as viewed on the line 4—4 of Figure 1.

In the present instance, the invention is disclosed as applied to a tractor disk harrow comprising a pair of implement or gang frames 10 and 11, which are preferably of oblong rectangular form and arranged in tandem relation with the longer diameters of the frames extending transversely to the direction of travel. Each frame carries a disk gang 12 and the disks of the gangs in the respective frames have their concave sides directed in opposite directions. The inside bars of the two frames are connected in such manner as to allow pivotal or angular adjustment of the frames with relation to one another in a horizontal plane while rigidly connecting them as against relative vertical tilting movement. This connection is here shown as comprising arcuate frame bars 13 and 14 extending towards each other from the respective implement frames and suitably braced thereon as by truss members 15 and 16. These projecting portions of the respective frames are connected by crossed members 17—18 which are pivoted to the respective frames at points within the arcuate bars 13 and 14. The disk harrow structure so far described is that of assignee's copending application of William C. Dwyer, Serial No. 231,433 filed November 7, 1927, and is part of the present invention only in so far as it cooperates with the mechanism and structure now to be described.

The draft applying and frame angling structure forming the subject-matter of the present invention preferably comprises a draft frame which is formed of a rigid transversely extended member 20 and forwardly converging members 21 and 22. The members 21 and 22 are rigid bars connected together as at 23, and the triangular draft frame formed by the interconnected rigid members described is adapted for connection at its apex to the draft bar of a tractor shown in part at 24. The draft member 22 is preferably formed in two or more overlapping sections provided with registering apertures, so that the length of this member may be varied to alter the form of the draft frame and thereby the trailing position of the harrow. The transverse draft member 20 is pivotally connected on a vertical axis at 25 to one side or end of the front implement frame 10, and the end of the bar 20 away from the pivot 25 is slidably supported on an arcuate bar 26 projecting forwardly from the opposite end of frame 10. As best seen in Figures 3 and 4, the transverse member 20 adjacent its free end carries an inverted U-shaped guide piece 27 which is suitably secured to the member 20 and provided adjacent its base with a transverse bolt or pin 28. The guide member 27 receives a ratchet bar 29 which is pivoted on frame 10 at 30. The ratchet teeth formed on the lower edge of bar 29 ride over the pin 28 and are so inclined as to permit rearward swinging movement of the member 20 while locking it against forward movement. The ratchet bar 28 is provided with an eye 31 at its forward end for reception of an operating cord 32 extending to the operator's station on the tractor. The under side of the member 20 is preferably provided with an angular guide piece 33 embracing the supporting bar 26 and retaining the member 20 in position thereon. The end of the rear implement frame 11 opposite to the end of the front frame on which the member 20 is pivoted is connected through a pivoted link 34 with the free end of member 20. The construction described, therefore, exemplifies an arrangement in which there is used a horizontally swingable draft frame which is pivoted to the forward frame of the tandem harrow at a point to one side of the longitudinal median line of the harrow and pivotally connected to the rear frame on the opposite side of said longitudinal median line, as through the link 34, and is, therefore, movable by draft force into different positions with respect to the frames. The operation will accordingly be such that the draft force applied to the swinging draft frame will be transmitted to the opposite ends of the front and rear implement frames and at opposite sides of the pivotal connection between them, thus positively moving each of them on said pivotal connection and causing relative swinging movement between the draft frame and the front implement frame.

In operation, the draft frame is usually adjusted to form an obtuse angled triangle, as seen in Figures 1 and 2, thus offsetting the harrow from the tractor for work adjacent a row of trees, as in an orchard. Starting with the implement frames in the parallel or non-working position of Figure 1, the ratchet 29 is raised to release the draft frame, permitting it and the front implement frame to swing with respect to each other towards the position of Figure 2. During this forward swing of the draft frame relatively to the front implement frame, the draft force will be applied to one end of the front frame through the pivotal connection at 25 and to the opposite end of the rear frame through the link 34, thus pulling the frames into angular relation, in which position they will be retained during forward travel by engagement of a forward notch in bar 29 with the pin 28. Backing of the tractor will automatically cause reversal of the operation above described and restore the implement frames to parallel position where they will be retained by locking of the ratchet bar until it is again released.

There has accordingly been provided a simple and efficient form of draft controlled angling mechanism for tandem disk harrows of the two gang type. It will be obvious to those skilled in the art that certain modifications in the structure disclosed may be made without departure from the scope of the invention as defined in the following claims.

What is claimed as new is:

1. A tractor harrow comprising a pair of implement frames disposed in tandem relation, means pivotally connecting the frames for relative horizontal angular movement, and draft actuated means for effecting angular adjustment of the frames on said pivotal connecting means comprising rigid interconnected draft members having a pivotal draft connection with the front frame at one side of the pivotal connecting means between the frames and with the rear frame on the opposite side of said connecting means, and means for controlling pivotal movement of said draft members with respect to the frames.

2. A tractor harrow comprising a pair of implement frames disposed in tandem relation, means connecting the frames between the ends thereof for horizontal angular movement, and draft actuated means for effecting angular adjustment of the frames on said connecting means comprising a pair of forwardly converging rigid draft members one of which is pivotally connected to one end of the forward frame and the second supported on the other end of said frame for slidable movement in a fore and aft direction, a connection between the rear frame and said second draft member, and means for controlling the slidable movement of said draft member on the front frame.

3. A tractor harrow comprising a pair of implement frames disposed in tandem relation, means pivotally connecting the frames for relative angular movement horizontally, a transversely extended draft actuated member pivoted to one of the frames on a vertical axis for movement in a limited arc, a pivoted link connection between said member and the other implement frame, actuating means connecting said member to a tractor, and means for controlling movement of the draft actuated member.

4. A tractor harrow comprising a pair of implement frames disposed in tandem relation, means pivotally connecting the frames for relative angular movement horizontally, a transversely extended draft actuated member having one end pivoted at a lateral point to the front frame for movement in a limited arc, a connection between the other end of said member and the rear implement frame, means on said member for connecting it to a tractor, and means for adjustably locking the draft actuated member to the front frame.

5. A tractor harrow comprising a pair of implement frames disposed in tandem relation, means pivotally connecting the frames for relative horizontal angular movement, a draft frame comprising forwardly converging draft members and a transverse member, said transverse member being pivoted at one end to one side of the forward frame and having its other end slidably supported on the opposite side of said frame, latch mechanism for controlling the movement of the draft frame with respect to the forward frame, and a link connecting the draft frame with one end of the rear implement frame.

6. A tractor harrow comprising a pair of implement frames disposed in tandem relation, means pivotally connecting the frames for horizontal angular movement, and draft actuated means for effecting angular adjustment of the frames on said pivotal connecting means comprising two forwardly converging draft bars connected together at the forward ends, one of said bars being pivotally connected to one end of the forward frame and the second bar being slidably mounted at the other end of said frame for fore and aft movement, latch controlled means for adjusting said slidable mounting under draft power, and a pivoted link connection between the second draft bar and a point on the rear implement frame laterally spaced from the pivotal connection between the frames.

7. A tractor harrow comprising a pair of implement frames disposed in tandem relation, means pivotally connecting the frames for horizontal angular movement, and draft actuated means for effecting angular adjustment of the frames on said pivotal connecting means comprising draft members connected to the respective side ends of the front frame, means in said connections for causing horizontal angular adjustment of said draft members relatively to the frames by draft power, and a pivoted link connection between one of said draft members and a point on the rear implement frame laterally spaced from the pivotal connection between the frames.

8. In a disk cultivator, the combination of: a front-gang; a rear-gang; a gang-pivot for pivoting together said front-gang and rear-gang; a draft-frame; a frame-pivot for pivoting together said front-gang and said draft-frame for relative swinging movement; and rear-gang operating-means connected to said rear-gang and said draft-frame for insuring a rearward swinging of said rear-gang relative to said front-gang upon a forward swinging of said draft-frame relative to said front-gang.

9. In a disk cultivator, the combination of: a front-gang; a rear-gang; a gang pivot for pivoting together said front-gang and rear-gang; a draft-frame; a frame-pivot for pivoting together said front-gang and said draft-frame; and rear-gang operating-means connected to said rear-gang and said draft-frame, actuated by a relative swinging movement between said front-gang and said draft-frame in such a manner as to swing said rear-gang relative to said front-gang.

10. In a disk cultivator, the combination of: a front-gang; a rear-gang; a gang-pivot for pivoting together said front-gang and rear-gang; a draft-frame; a frame-pivot for pivoting together said front-gang and said draft-frame; rear-gang operating-means connected to said rear-gang and said draft-frame, actuated by a relative swinging movement between said front-gang and said draft-frame in such a manner as to swing said rear-gang relative to said front-gang; and release mechanism for permitting a relative pivotal movement between said front-gang and draft-frame.

In testimony whereof I affix my signature.

JOSEPH R. BARKER.